(12) United States Patent
Liu et al.

(10) Patent No.: US 9,075,562 B2
(45) Date of Patent: *Jul. 7, 2015

(54) DRIVING METHOD OF DISPLAY PANEL AND ELECTROPHORESIS DISPLAY APPARATUS USING THE SAME METHOD

(75) Inventors: Su-Cheng Liu, Hsinchu (TW); Ming-Chuan Hung, Hsinchu (TW)

(73) Assignee: E INK HOLDINGS INC., Hsinchu (TW)

( * ) Notice: Subject to any disclaimer, the term of this patent is extended or adjusted under 35 U.S.C. 154(b) by 141 days.

This patent is subject to a terminal disclaimer.

(21) Appl. No.: 13/277,477

(22) Filed: Oct. 20, 2011

(65) Prior Publication Data

US 2012/0182327 A1    Jul. 19, 2012

(30) Foreign Application Priority Data

Jan. 19, 2011  (TW) .............................. 100101996 A (51) Int. Cl.
 *G09G 5/10* (2006.01)
 *G06F 3/147* (2006.01)
 *G09G 3/00* (2006.01)
 *G09G 3/34* (2006.01)

(52) U.S. Cl.
 CPC ................ *G06F 3/147* (2013.01); *G09G 3/004* (2013.01); *G09G 3/344* (2013.01); *G09G 2330/021* (2013.01)

(58) Field of Classification Search
 CPC . G06F 3/0481; G06F 3/04842; G06F 17/211; G06F 17/212; G06F 17/3028; G06F 3/048; G06F 3/0482; G06F 3/0483; G06F 9/542; G09G 3/3611; G09G 5/10; G09G 3/20; G09G 3/2003; G09G 3/344; G09G 2320/0626; G09G 5/393; G06T 11/00

USPC ........... 345/107, 690, 296, 619, 660; 359/296
See application file for complete search history.

(56) References Cited

U.S. PATENT DOCUMENTS 8,174,754 B2 * 5/2012 Lee et al. ...................... 359/296
2006/0125849 A1 * 6/2006 Kubota et al. ................. 345/690

(Continued)

FOREIGN PATENT DOCUMENTS

CN  101645238  2/2010
CN  101645239  2/2010

(Continued)

OTHER PUBLICATIONS

China Patent Office, "Office Action", Sep. 11, 2013.

(Continued)

*Primary Examiner* — Amare Mengistu
*Assistant Examiner* — Gloryvid Figueroa-Gibson
(74) *Attorney, Agent, or Firm* — WPAT, PC; Justin King (57) ABSTRACT

A driving method of a display panel includes the following steps: driving the display panel to display a first image frame and providing display data of a second image frame, and each of the first and the second image frames has a first area and a second area for respectively displaying two different display contents, the positions of the two corresponding first areas overlap, and the positions of the two corresponding second areas overlap; determining whether display content differences exist between the two corresponding first areas, and determining whether display content differences exist between the two corresponding second areas, and driving the area where display content differences exist in the two areas of the first image frame to display a first-color display content when display content differences exist between the two corresponding first areas or the two corresponding second areas. Furthermore, a corresponding electrophoresis display apparatus is also provided.

7 Claims, 8 Drawing Sheets

(56) References Cited

U.S. PATENT DOCUMENTS

| | | |
|---|---|---|
| 2006/0203008 A1* | 9/2006 | Hiroshige .................. 345/619 |
| 2009/0085930 A1* | 4/2009 | Shoya et al. ............... 345/619 |
| 2009/0109171 A1* | 4/2009 | Akaiwa ...................... 345/107 |
| 2010/0073277 A1* | 3/2010 | Lee et al. .................... 345/107 |

FOREIGN PATENT DOCUMENTS

| | | |
|---|---|---|
| CN | 101727832 | 6/2010 |
| TW | 200828236 A | 7/2008 |
| TW | 201005703 A | 2/2010 |
| TW | 201007654 A | 2/2010 |
| TW | 201015508 A | 4/2010 |

OTHER PUBLICATIONS

Taiwan Intellectual Property Office, "Office Action", Sep. 18, 2013, Taiwan.

* cited by examiner

DRIVING METHOD OF DISPLAY PANEL AND ELECTROPHORESIS DISPLAY APPARATUS USING THE SAME METHOD

FIELD OF THE DISCLOSURE

The present disclosure relates to a driving method, and more particularly to a driving method of a display panel and an electrophoresis display apparatus using the same method.

BACKGROUND OF THE DISCLOSURE

Compared to other types of display apparatus, the electrophoresis display apparatus has advantages such as light, thin and easy to carry, so the display industries in recent years focus much on the development of the electrophoresis display technology. Moreover, because the electrophoresis display apparatus further has a bi-stable feature which benefits for maintaining the display contents so as only limit power is consumed while the electrophoresis display apparatus is updating a new image frame, thereby the electrophoresis display apparatus also has an advantage of low power consumption.

However, some power may be still unnecessarily wasted while an electrophoresis display apparatus is updating display contents from a current frame image to a next image frame. That is, in the typical electrophoresis display technology, at least an all-black (or all-white) image frame, for the elimination of the image persistence resulted by the display content of the current image frame, is displayed between the current and the next image frames while the electrophoresis display apparatus is updating the display contents. Accordingly, power waste may occur if the current image frame and the next image frame have minor display content differences in between.

SUMMARY OF THE DISCLOSURE

The present disclosure provides a driving method of a display panel. The driving method is suitable for an electrophoresis display apparatus and is used for saving power consumption on the electrophoresis display apparatus.

The present disclosure also provides an electrophoresis display apparatus using the aforementioned driving method.

The present disclosure provides a driving method of a display panel, and the driving method includes the following steps: driving the display panel to display a first image frame and providing display data of a second image frame, and each of the first and the second image frames has a first area and a second area for displaying two different display contents, the positions of the two corresponding first areas of the first and the second image frames overlap, and the positions of the two corresponding second areas of the first and the second image frames overlap; determining whether display content differences exist between the two corresponding first areas of the first and the second image frames, and determining whether display content differences exist between the two corresponding second areas of the first and the second image frames, and driving the area where display content differences exist in the first and the second areas of the first image frame to display a first-color display content to further update the display contents when display content differences exist between the two corresponding first areas or exist between the two corresponding second areas.

The present disclosure provides an electrophoresis display apparatus, which includes a display panel, a gate driver, a source driver, and a timing controller. The gate driver is coupled to the display panel. The source driver is coupled to the display panel. The timing controller is coupled to the gate driver and the source driver. The timing controller is used for driving the display panel to display a first image frame by the gate driver and the source driver and receiving a display data of a second image frame, and each of the first and the second image frames has a first area and a second area for displaying two different display contents, the positions of the two corresponding first areas of the first and the second image frames overlap, and the positions of the two corresponding second areas of the first and the second image frames overlap. The timing controller further determines whether display content differences exist between the two corresponding first areas of the first and the second image frames and determines whether display content differences exist between the two corresponding second areas of the first and the second image frames. And the timing controller drives the display panel by the gate driver and the source driver, so as to enable the area where display content differences exist in the first and the second areas of the first image frame to display a first-color display content to further update the display contents when display content differences exist between the two corresponding first areas or exist between the two corresponding second areas.

The present disclosure is about applying the aforementioned driving method of a display panel to an electrophoresis display apparatus for solving the aforementioned power wasting problems. That is, the aforementioned driving method of a display panel, to achieve power saving on an electrophoresis display apparatus, is suitable for an electrophoresis display apparatus including a current image frame (referred as the first image frame) and a next image frame (referred as the second image frame) both having a first area and a second area for respectively displaying two different display contents, and the positions of the two corresponding first areas of the current and the next image frames overlap, and the positions of the two corresponding second areas of the current and the next image frames overlap. The electrophoresis display apparatus, adopting the aforementioned driving method, firstly determines whether display content differences exist between the two corresponding first areas of the current and the next image frames, and the electrophoresis display apparatus also determines whether display content differences exist between the two corresponding second areas of the current and the next image frames. If the electrophoresis display apparatus determines that display content differences exist between the two corresponding first areas or the two corresponding second areas of the current and the next image frames, the electrophoresis display apparatus drives the area where display content differences exist in the first and the second areas of the current image frame to display a first-color display content to further update the display contents. Therefore, when the electrophoresis display apparatus determines that there are just some differences between the display content of the current image frame and the display content of the next image frame, the electrophoresis display apparatus performs a ghost image elimination operation only on the area where display content differences exist in the first and the second areas. Thus, the power saving on the electrophoresis display apparatus is achieved.

BRIEF DESCRIPTION OF THE DRAWINGS

The above objects and advantages of the present disclosure will become more readily apparent to those ordinarily skilled in the art after reviewing the following detailed description and accompanying drawings, in which:

FIG. 8 (FIGS. 8A and 8B) is a flow chart of a driving method in accordance with an embodiment of the present disclosure.

DETAILED DESCRIPTION OF PREFERRED EMBODIMENTS

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

To get a clear understanding of the present disclosure related to a driving method of a display panel and an electrophoresis display apparatus using the same, the embodiments of the present disclosures will be described with specific figures below in detail.

Embodiment 1

Figure 1:
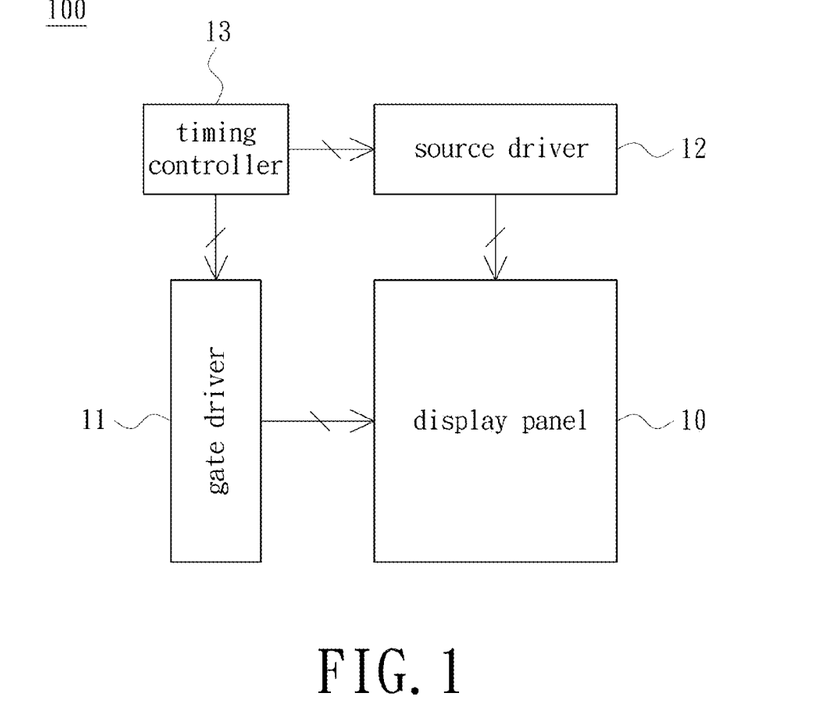
FIG. 1 is a schematic block diagram of an electrophoresis display apparatus in accordance with an embodiment of the present disclosure.

FIG. 1 is a block diagram that schematically depicts an electrophoresis display apparatus in one embodiment of the present disclosure. As depicted in FIG. 1, an electrophoresis display apparatus 100 mainly includes a display panel 10, a gate driver 11, a source driver 12, and a timing controller 13. The gate driver 11 and the source driver 12 are both coupled to the display panel 10, and the timing controller 13 is coupled to both the gate driver 11 and the source driver 12. By the gate driver 11 and the source driver 12, the timing controller 13 drives the display panel 10 to display a desired image frame.

Figure 2:
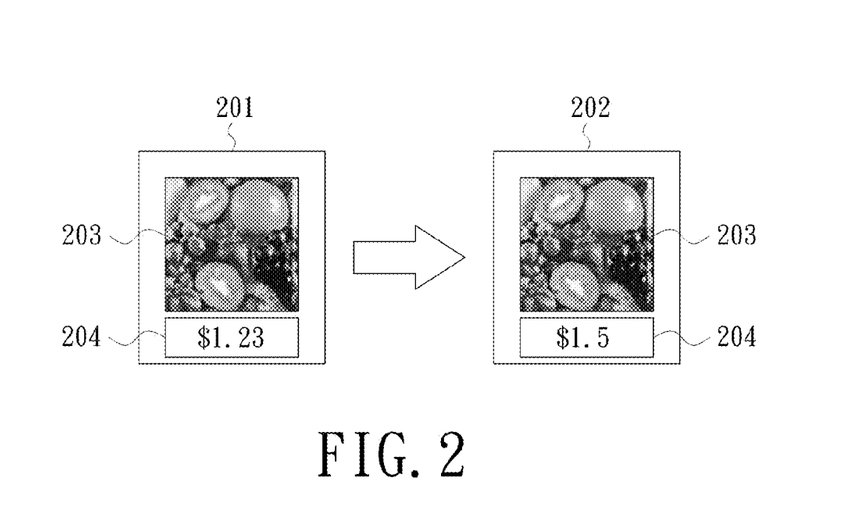
FIG. 2 is a schematic diagram of two image frames.

FIG. 2 is a diagram that schematically depicts two images frames which are sequentially displayed on the display panel 10 of the electrophoresis display apparatus 100. As depicted in FIG. 2, the image frame 201 (referred as a first image frame) is the image frame that the electrophoresis display apparatus 100 (of FIG. 1) is currently displaying on the display panel 10, and the image frame 202 (referred as a second image frame) is the next image frame that will be displayed on the display panel 10 after the image frame 201. Moreover, both the image frames 201, 202 have an area 203 (referred as a first area) and an area 204 (referred as a second area) for respectively displaying two different display contents. Moreover, the positions of the two corresponding areas 203 of the image frames 201, 202 overlap, and the positions of the two corresponding areas 204 of the image frames 201, 202 overlap. As depicted in FIG. 2, the display content displayed on the area 203 of the image frame 201 is same as that on the corresponding area 203 of the image frame 202, and display content displayed on the area 204 of the image frame 201 is different from that on the corresponding area 204 of the image frame 202.

Please refer to both FIGS. 2 and 1. After the display data of the second image frame 202 is transmitted to the timing controller 13 while the display panel 10 is displaying the image frame 201, the timing controller 13 accordingly determines whether display content differences exist between the two corresponding areas 203 of the image frames 201, 202; similarly, the timing controller 13 also determines whether display content differences exist between the two corresponding areas 204 of the image frames 201, 202. If the timing controller 13 determines that there are display content differences existed between the two corresponding areas 203 (or the two corresponding areas 204) of the image frames 201, 202, the timing controller 13 then drives the display panel 10 by the gate driver 11 and the source driver 12, so as to display a first-color display content on the area 203 (or area 204) of the image frame 201, for further updating the display contents of the display panel 10. Here, the aforementioned first-color display content is either white or black.

Take FIG. 2 as an example. When the timing controller 13 determines that the display contents displayed on the two corresponding areas 203 of the image frames 201, 202 are the same display contents but display content differences exist between the two corresponding areas 204 of the image frames 201, 202, the timing controller 13 then further performs an operation procedure for the elimination of ghost image, as illustrated in either FIG. 3A or 3B.

Figure 3A:
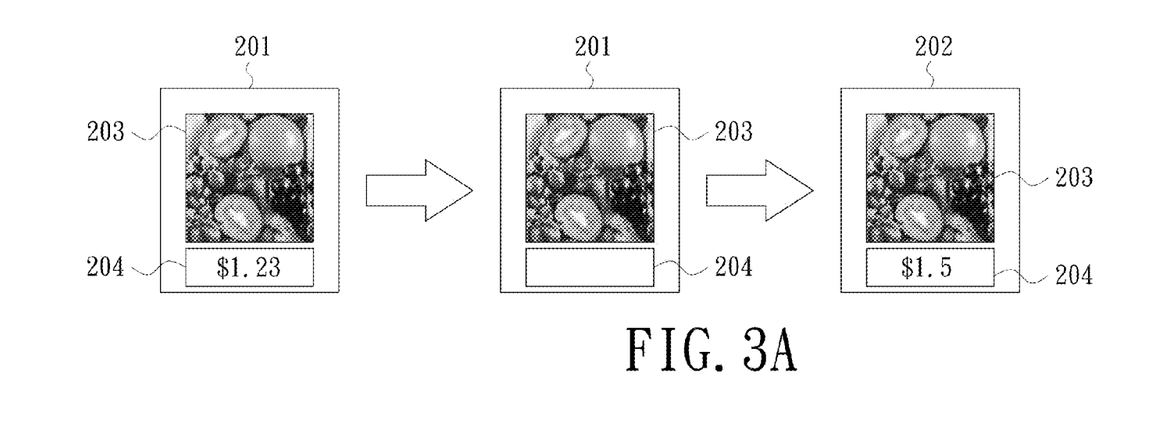
FIG. 3A is a schematic diagram illustrating an implementation in accordance with an embodiment of the driving method of a display panel of the present disclosure.
Figure 3B:
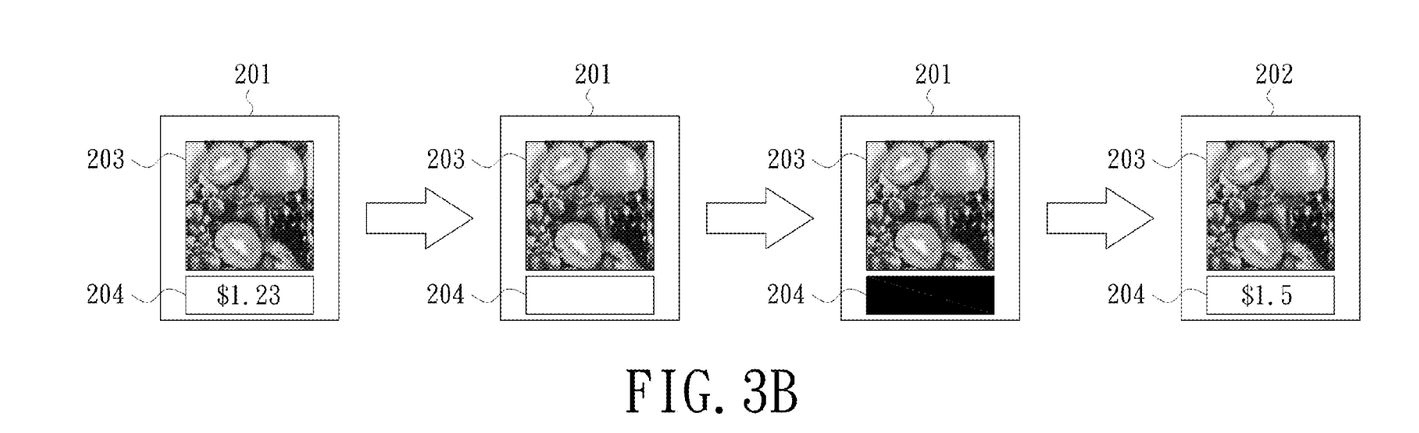
FIG. 3B is a schematic diagram illustrating another implementation in accordance with an embodiment of the driving method of a display panel of the present disclosure.

FIGS. 3A and 3B respectively illustrate an implementation of the driving method of a display panel in one embodiment of the present disclosure. Please refer to both FIGS. 2 and 3A. When the timing controller 13 determines that display content differences only exist between the two corresponding areas 204 of the image frames 201, 202, the timing controller 13 then drives the display panel 10 by the gate driver 11 and the source driver 12, so as to display a white-color display content on the area 204 of the image frame 201, thereby the image persistence occurred on the area 204 and resulted by the original display content of the image frame 201 is eliminated by the white-color display content. Afterwards, by the gate driver 11 and the source driver 12, the timing controller 13 further drives the display panel 10 to display the image frame 202 by updating the display content on the area 204 of the image frame 201 according to the received display data of the image frame 202, so as the process of the timing controller 13 driving the display panel 10 from displaying the image frame 201 to displaying the image frame 202 is done.

Base on the same manner, it is understood that the timing controller 13 can also drives the display panel 10 to display a black-color display content on the area 204 of the image frame 201 if display content differences only exist between the two corresponding areas 204 of the image frames 201, 202, thereby the image persistence occurred on the area 204 and resulted by the original display contents of the image frame 201 is eliminated by the black-color display content. Afterwards, by the gate driver 11 and the source driver 12, the timing controller 13 further drives the panel 10 to display the image frame 202 by updating the display content on the area 204 of the image frame 201 according to the received display data of the image frame 202, so as the process of the timing controller 13 driving the display panel 10 from displaying the image frame 201 to displaying the image frame 202 is done.

Please refer to both FIGS. 2 and 3B. When the timing controller 13 determines that display content differences only exist between the two corresponding areas 204 of the image frames 201, 202, the timing controller 13 sequentially drives the display panel 10 to display a white-color display content and a black-color display content on the area 204 of the image frame 201, thereby the image persistence occurred on the area 204 and resulted by the original display content of the image frame 201 is eliminated by the two white-color and black-color display contents. Afterwards, by the gate driver 11 and the source driver 12, the timing controller 13 further drives the panel 10 to display the image frame 202 by updating the display content on the area 204 of the image frame 201 according to the received display data of the image frame 202, so as the process of the timing controller 13 driving the display panel 10 from displaying the image frame 201 to displaying the image frame 202 is done. It is understood that the sequence of displaying the white-color display content and displaying the black-color display content on the area 204 of the image frame 201 can be performed reversely.

According to the illustrations depicted in FIG. 3B, after displaying the first-color display content (either white-color or black-color display content) on the area 203 or area 204 (which containing display content differences, compared to its corresponding area of the image frame 202) of the image frame 201 and before further updating the display content on the corresponding area 203 or area 204 of the image frame 201, the timing controller 13 further drives the panel 10 from displaying the first-color display content to displaying a second-color display content (either white-color or black-color display content, but not same as the first-color display content) on the corresponding area 203 or area 204 of the image frame 201, thereby a better elimination of the image persistence is realized.

Therefore, if the display content differences only exist partial area between the current and the next image frames, the image persistence elimination is only needed to be performed on the specific partial area (containing display content differences, compared to the corresponding area of the next image frame) of the current image frame, thereby a better power saving on the electrophoresis display apparatus is achieved.

Embodiment 2

Figure 4:
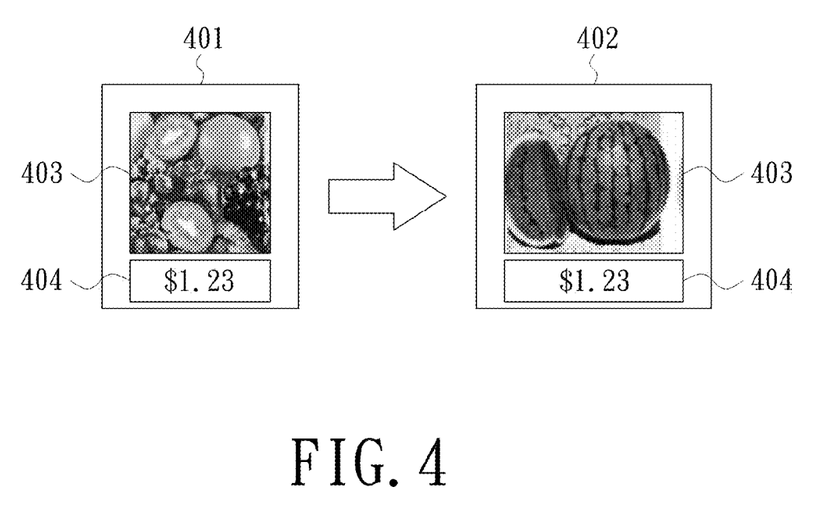
FIG. 4 is a schematic diagram of two image frames.

FIG. 4 is a diagram that schematically depicts two images frames which are sequentially displayed on the display panel 10 of the electrophoresis display apparatus 100. As depicted in FIG. 4, the image frame 401 (referred as a first image frame) is the image frame that the electrophoresis display apparatus 100 (of FIG. 1) is currently displaying on the display panel 10, and the image frame 402 (referred as a second image frame) is the next image frame that will be displayed on the display panel 10 after the image frame 401. Moreover, both the image frames 401, 402 have an area 403 (referred as a first area) and an area 404 (referred as a second area) for respectively displaying two different display contents. Moreover, the positions of the two corresponding areas 403 of the image frames 401, 402 overlap, and the positions of the two corresponding areas 404 of the image frames 401, 402 overlap. As depicted in FIG. 4, the display content displayed on the area 404 of the image frame 401 is the same as that on the corresponding area 404 of the image frame 402, and the display content displayed on the area 403 of the image frame 401 is different from that on the corresponding area 403 of the image frame 402.

Please refer to both FIGS. 4 and 1. After the display data of the second image frame 402 is transmitted to the timing controller 13 while the display panel 10 is displaying the image frame 401, the timing controller 13 accordingly determines whether the display content differences exist between the two corresponding areas 403 of the image frames 401, 402; similarly, the timing controller 13 also determines whether the display content differences exist between the two corresponding areas 404 of the image frames 401, 402. If the timing controller 13 determines that there are display content differences existed between the two corresponding areas 403 (or the two corresponding areas 404) of the image frames 401, 402, the timing controller 13 then drives the display panel 10 to display a first-color display content on the area 403 (or area 404) of the image frame 401, for further updating the display contents of the display panel 10. Here, the aforementioned first-color display content is either white or black.

Take FIG. 4 as an example. When the timing controller 13 determines that the display contents displayed on the two corresponding areas 404 of the image frames 401, 402 are the same display contents but display content differences exist between the two corresponding areas 403 of the image frames 401, 402, the timing controller 13 then further performs an operation procedure for the elimination of the image persistence, as illustrated in either FIG. 5A or 5B.

Figure 5A:
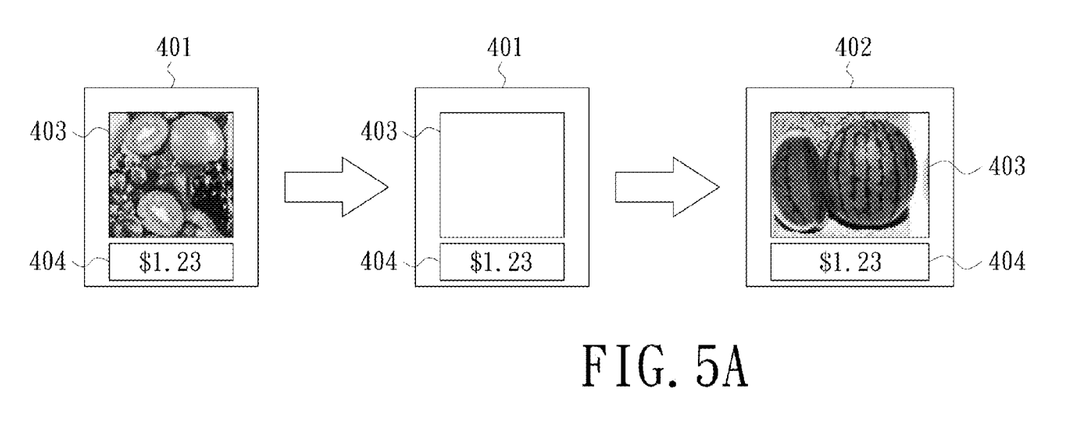
FIG. 5A is a schematic diagram illustrating an implementation in accordance with another embodiment of the driving method of a display panel of the present disclosure.
Figure 5B:
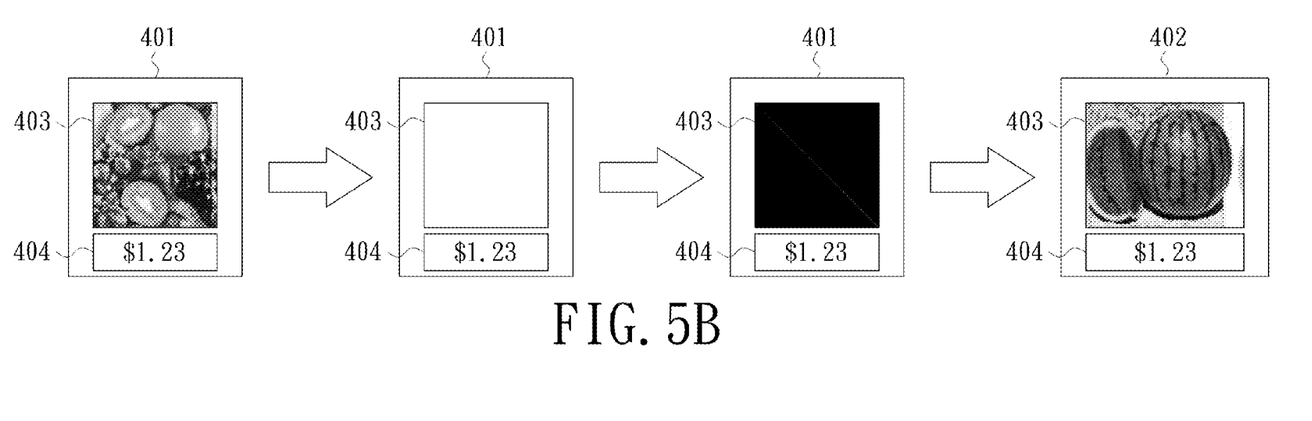
FIG. 5B is a schematic diagram illustrating another implementation in accordance with another embodiment of the driving method of a display panel of the present disclosure.

FIGS. 5A and 5B respectively illustrate an implementation of the driving method of a display panel in one embodiment of the present disclosure. Please refer to both FIGS. 4 and 5A. When the timing controller 13 determines that display content differences only exist between the two corresponding areas 403 of the image frames 401, 402, the timing controller 13 then drives the display panel 10 to display a white-color display content on the area 403 of the image frame 401, thereby the image persistence occurred on the area 403 and resulted by the original display content of the image frame 401 is eliminated by the white-color display content. Afterwards, by the gate driver 11 and the source driver 12, the timing controller 13 further drives the display panel 10 to display the image frame 402 by updating the display content on the area 403 of the image frame 401 according to the received display data of the image frame 402, so as the process of the timing controller 13 driving the display panel 10 from displaying the image frame 401 to displaying the image frame 402 is done.

Base on the same manner, it is understood that the timing controller 13 can also drives the display panel 10 to display a black-color display content on the area 403 of the image frame 401 if display content differences only exist between the two corresponding areas 403 of the image frames 401, 402, thereby the image persistence occurred on the area 403 and resulted by the original display content of the image frame 401 is eliminated by the black-color display content. Afterwards, by the gate driver 11 and the source driver 12, the timing controller 13 further drives the panel 10 to display the image frame 402 by updating the display content on the area 403 of the image frame 401 according to the received display data of the image frame 402, so as the process of the timing controller 13 driving the display panel 10 from displaying the image frame 401 to displaying the image frame 402 is done.

Please refer to both FIGS. 4 and 5B. When the timing controller 13 determines that display content differences only exist between the two corresponding areas 403 of the image frames 401, 402, the timing controller 13 sequentially drives the display panel 10 to display a white-color display content and a black-color display content on the area 403 of the image frame 401, thereby the image persistence occurred on the area 403 and resulted by the original display content of the image frame 401 is eliminated by the two white-color and black-color display contents. Afterwards, by the gate driver 11 and the source driver 12, the timing controller 13 further drives the panel 10 to display the image frame 402 by updating the display content on the area 403 of the image frame 401 according to the received display data of the image frame 402, so as the process of the timing controller 13 driving the display panel 10 from displaying the image frame 401 to displaying the image frame 402 is done. It is understood that the sequence of displaying the white-color display content and displaying the black-color display content on the area 403 of the image frame 401 can be performed reversely.

According to the illustrations depicted in FIG. 5B, after displaying the first-color display content (either white-color or black-color display content) on the area 403 or area 404 (which containing display content differences, compared to its corresponding area of the image frame 402) of the image frame 401 and before further updating the display content on the corresponding area 403 or area 404 of the image frame 401, the timing controller 13 further drives the panel 10 from displaying the first-color display content to displaying a second-color display content (either white-color or black-color display content, but not same as the first-color display content) on the corresponding area 403 or area 404 of the image frame 401, thereby a better elimination of the image persistence is realized.

Therefore, if the display content differences only exist partial area between the current and the next image frames, the image persistence elimination is only needed to be performed on the specific partial area (containing display content differences, compared to the corresponding area of the next image frame) of the current image frame, thereby a better power saving on the electrophoresis display apparatus is achieved.

Embodiment 3

Figure 6:
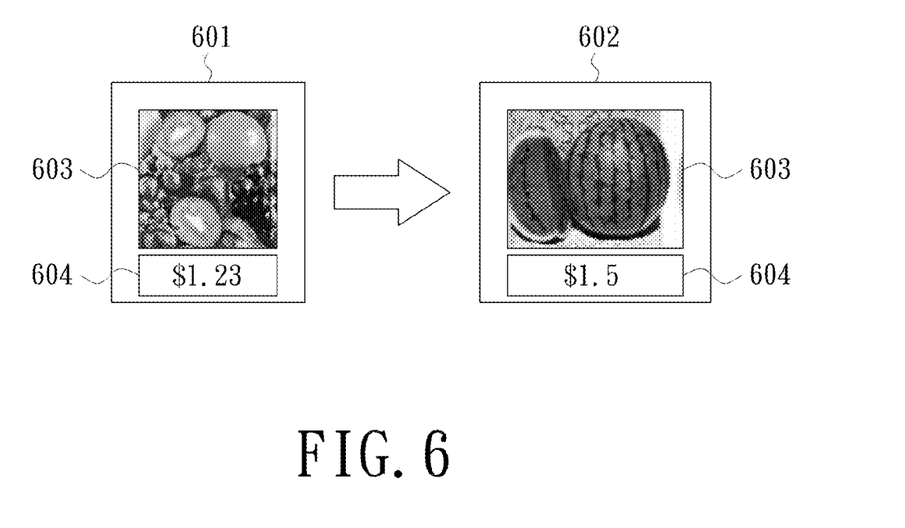
FIG. 6 is a schematic diagram of two image frames.

FIG. 6 is a diagram that schematically depicts two images frames which are sequentially displayed on the display panel 10 of the electrophoresis display apparatus 100. As depicted in FIG. 6, the image frame 601 (referred as a first image frame) is the image frame that the electrophoresis display apparatus 100 (of FIG. 1) is currently displaying on the display panel 10, and the image frame 602 (referred as a second image frame) is the next image frame will be displayed on the display panel 10 after the image frame 601. Moreover, both the image frames 601, 602 have an area 603 (referred as a first area) and an area 604 (referred as a second area) for respectively displaying two different display contents. Moreover, the positions of the two corresponding areas 603 of the image frames 601, 602 overlap, and the positions of the two corresponding areas 604 of the image frames 601, 602 overlap. As depicted in FIG. 6, the display content displayed on the area 603 of the image frame 601 is different from that on the corresponding area 603 of the image frame 602, and display content displayed on the area 604 of the image frame 601 is different from that on the corresponding area 604 of the image frame 602.

Please refer to both FIGS. 6 and 1. After the display data of the second image frame 602 is transmitted to the timing controller 13 while the display panel 10 is displaying the image frame 601, the timing controller 13 accordingly determines whether the display content differences exist between the two corresponding areas 603 of the image frames 601, 602; similarly, the timing controller 13 also determines whether the display content differences exist between the two corresponding areas 604 of the image frames 601, 602. If the timing controller 13 determines that display content differences exist between both the two corresponding areas 603 and the two corresponding areas 604 of the image frames 601, 602, the timing controller 13 then drives the display panel 10 from displaying the image frame 601 to displaying an all-first-color display content, for further updating the display contents of the display panel 10. Here, the aforementioned all-first-color display content is either white or black.

Take FIG. 6 as an example. When the timing controller 13 determines that the display content differences exist between both the two corresponding areas 603 and the two corresponding areas 604 of the image frames 601, 602, the timing controller 13 then further performs an operation procedure for the elimination of the image persistence, as illustrated in either FIG. 7A or 7B.

Figure 7A:
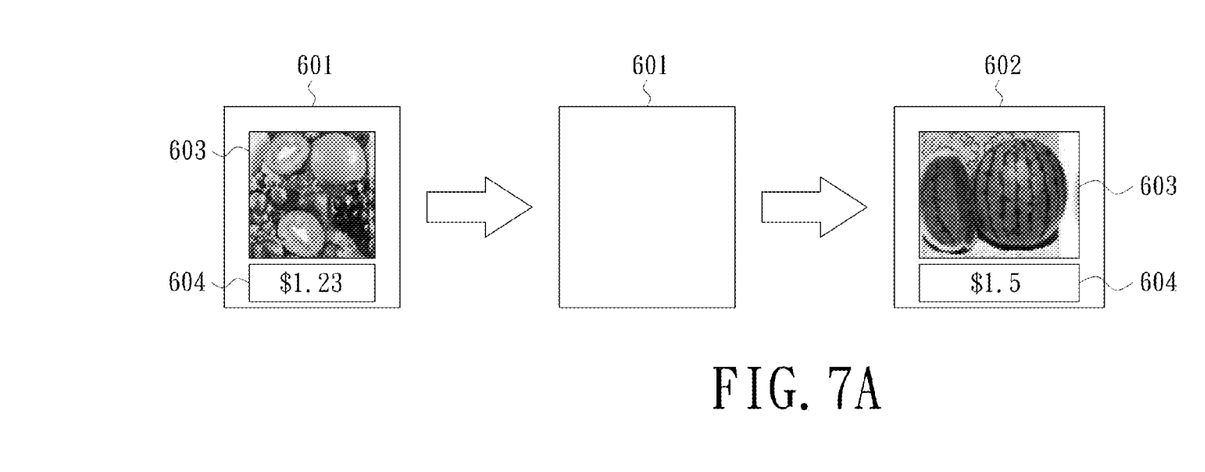
FIG. 7A is a schematic diagram illustrating an implementation in accordance with another embodiment of the driving method of a display panel of the present disclosure.
Figure 7B:
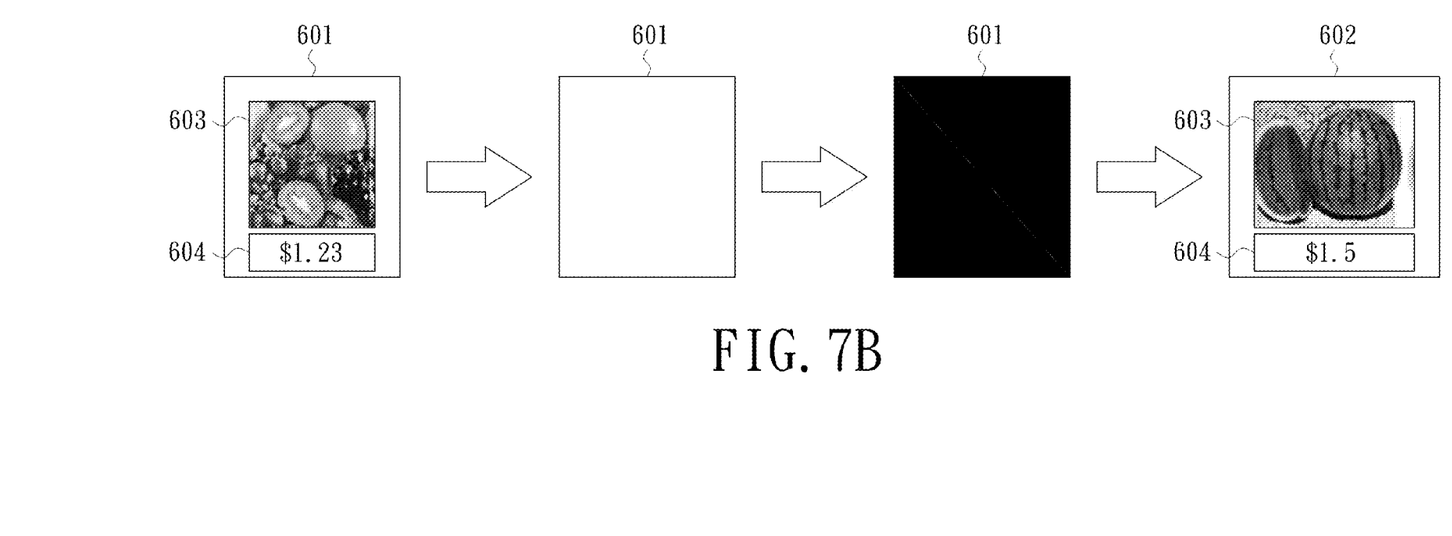
FIG. 7B is a schematic diagram illustrating another implementation in accordance with another embodiment of the driving method of a display panel of the present disclosure.

FIGS. 7A and 7B respectively illustrate an implementation of the driving method of a display panel in one embodiment of the present disclosure. Please refer to both FIGS. 6 and 7A. When the timing controller 13 determines that display content differences exist between both the two corresponding areas 603 and the two corresponding areas 604 of the image frames 601, 602, the timing controller 13 then drives the display panel 10 from displaying the image frame 610 to displaying an all-white-color display content, thereby the image persistence resulted by the display content of the image frame 601 is eliminated by the all-white-color display content. Afterwards, by the gate driver 11 and the source driver 12, the timing controller 13 further drives the display panel 10 to display the image frame 602 by updating the all-white-color display content according to the received display data of the image frame 602, so as the process of the timing controller 13 driving the display panel 10 from displaying the image frame 601 to displaying the image frame 602 is done.

Base on the same manner, it is understood that the timing controller 13 can also drives the display panel 10 from displaying the image frame 610 to displaying an all-black-color display content if display content differences exist between both the two corresponding areas 603 and the two corresponding areas 604 of the image frames 601, 602, thereby the image persistence resulted by the display content of the image frame 601 is eliminated by the all-black-color display content. Afterwards, by the gate driver 11 and the source driver 12, the timing controller 13 further drives the display panel 10 to display the image frame 602 by updating the all-black-color display content according to the received display data of the image frame 602, so as the process of the timing controller 13 driving the display panel 10 from displaying the image frame 601 to displaying the image frame 602 is done.

Please refer to both FIGS. 6 and 7B. When the timing controller 13 determines that display content differences exist between both the two corresponding areas 603 and the two corresponding areas 604 of the image frames 601, 602, the timing controller 13 sequentially drives the display panel 10 to display an all-white-color display content and an all-black-color display content on the display panel 10, thereby the image persistence resulted by the display content of the image frame 601 is eliminated by the both all-white-color and all-black-color display contents. Afterwards, by the gate driver 11 and the source driver 12, the timing controller 13 further drives the display panel 10 to display the image frame 602 by updating the all-black-color display content according to the received display data of the image frame 602, so as the process of the timing controller 13 driving the display panel 10 from displaying the image frame 601 to displaying the image frame 602 is done. It is understood that the sequence of displaying the all-white-color display content and displaying the all-black-color display content on the display panel 10 can be performed reversely.

According to the illustrations depicted in FIG. 7B, after displaying the all-first-color display content (either all-white-color or all-black-color display content) on the display panel 10 and before further updating the display content on the display panel 10, the timing controller 13 further drives the panel 10 from displaying the all-first-color display content to displaying an all-second-color display content (either all-white-color or all-black-color display content, but not same as the all-first-color display content) on the display panel 10, thereby a better elimination of the image persistence is realized.

Figure 8A:
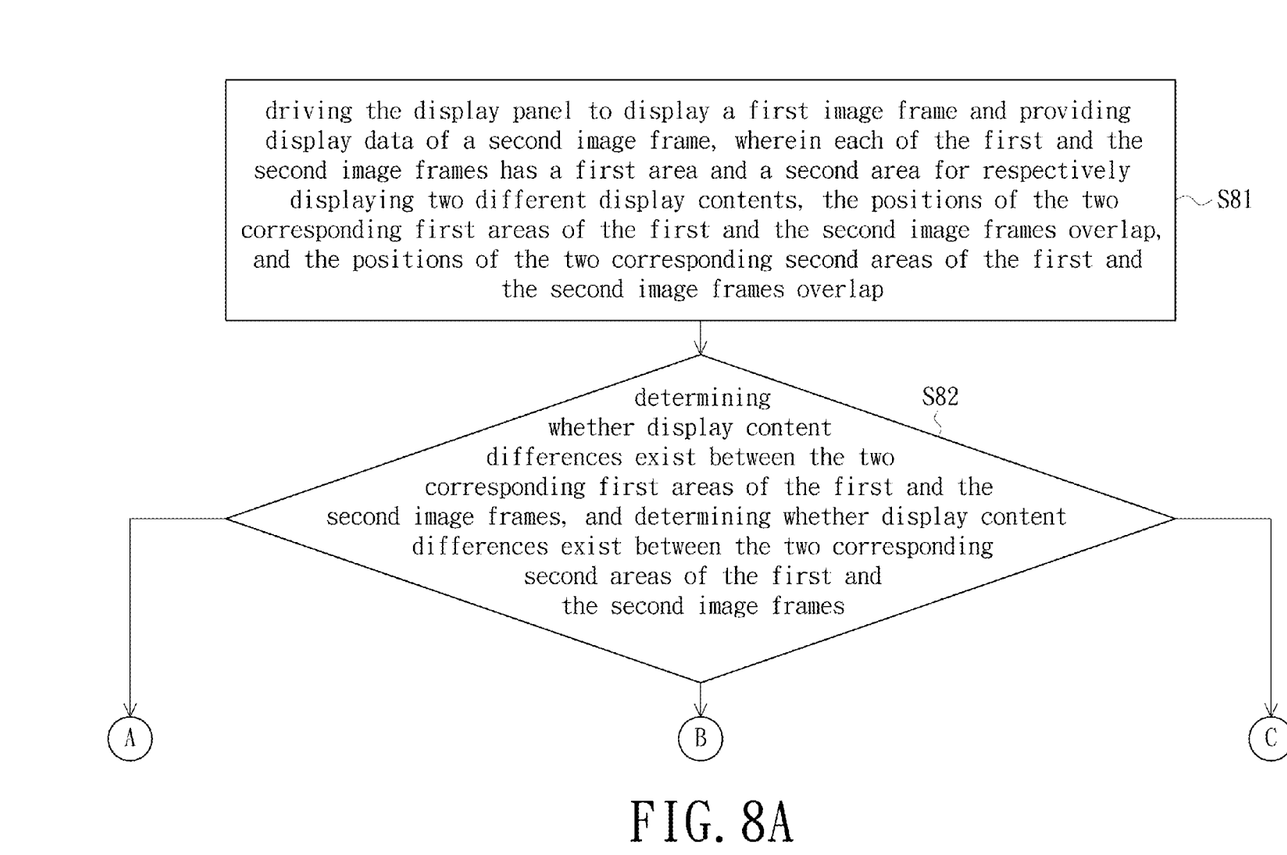
Figure 8B:
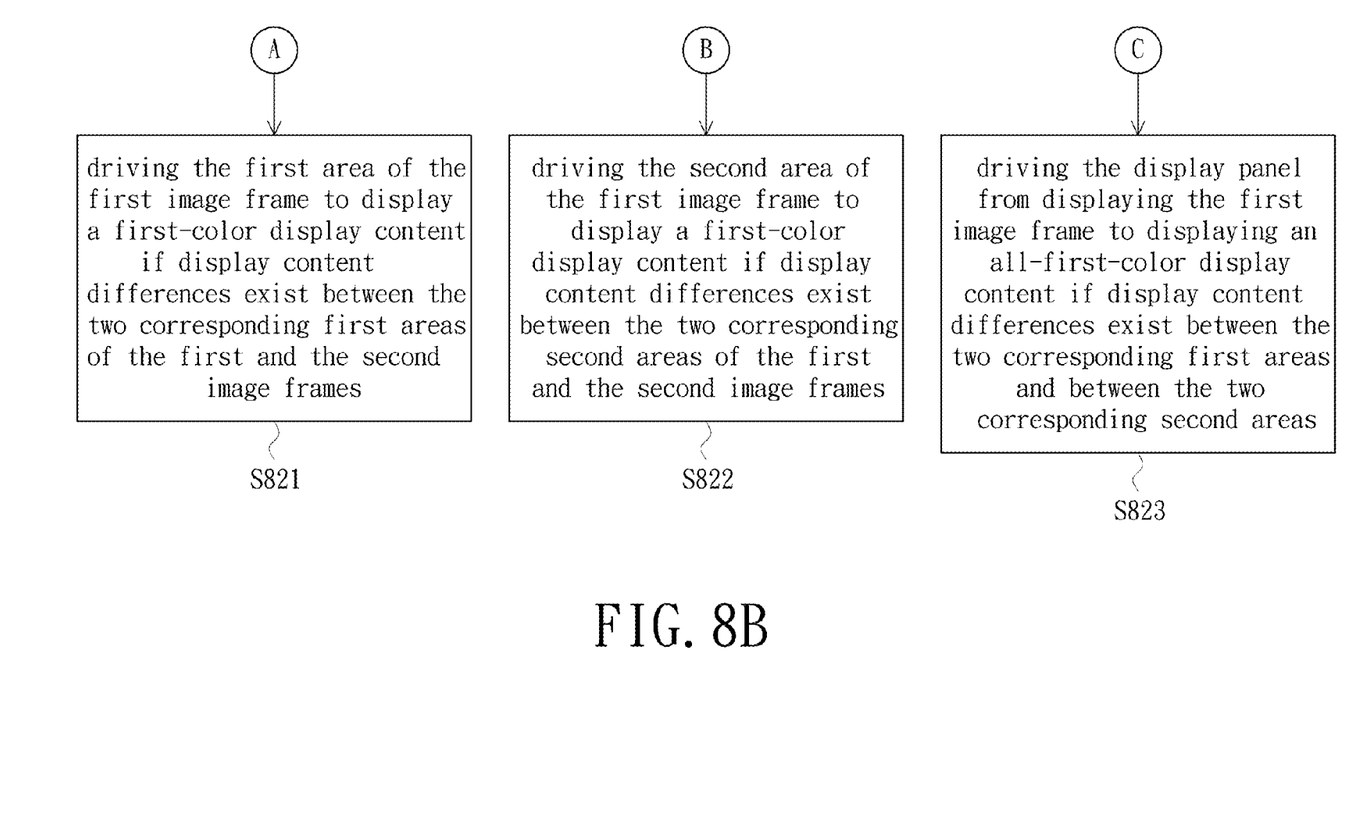

Through the implementations of the embodiments described above, the operation process of the electrophoresis display apparatus of the present disclosure can be summed up to basic steps as depicted in FIG. 8 (FIGS. 8A and 8B). FIG. 8 is a flow chart of a driving method of a display panel in accordance with one embodiment of the present disclosure, and the aforementioned display panel is equipped in an electrophoresis display apparatus. As depicted in FIG. 8, firstly, the electrophoresis display apparatus drives the display panel to display a first image frame and provides the display data of a second image frame, wherein each of the first and second image frames has a first area and a second area for respectively displaying two different display contents, the positions of the two corresponding first areas of the first and second image frames overlap, and the positions of the two corresponding second areas of the first and second image frames overlap (step S81). Afterwards, the electrophoresis display apparatus determines that whether the display content differences exist between the two corresponding first areas of the two aforementioned image frames, and the electrophoresis display apparatus also determines that whether the display content differences exist between the two corresponding second areas of the two aforementioned image frames (step S82). The electrophoresis display apparatus drives the display panel to display a first-color display content on the first area of the first image frame if the display content differences exist between the two corresponding first areas of the two aforementioned image frames (step S821). Or, the electrophoresis display apparatus drives the display panel to display a first-color display content on the second area of the first image frame if the display content differences exist between the two corresponding second areas of the two aforementioned image frames (step S822). Or, the electrophoresis display apparatus drives the display panel from displaying the first image frame to displaying an all-first-color display content if the display content differences exist between both the two corresponding first areas and two corresponding second areas of the two aforementioned image frames (step S823).

To sum up, the present disclosure is about applying the aforementioned driving method of a display panel to an electrophoresis display apparatus for solving the aforementioned power wasting problems. That is, the aforementioned driving method of a display panel, to achieve power saving on an electrophoresis display apparatus, is suitable for an electrophoresis display apparatus including a current image frame (referred as the first image frame) and a next image frame (referred as the second image frame) both having a first area and a second area for respectively displaying two different display contents, and the positions of the two corresponding first areas of the current and the next image frames overlap, and the positions of the two corresponding second areas of the current and the next image frames overlap. The electrophoresis display apparatus, adopting the aforementioned driving method, firstly determines whether display content differences exist between the two corresponding first areas of the current and the next image frames, and the electrophoresis display apparatus also determines whether display content differences exist between the two corresponding second areas of the current and the next image frames. If the electrophoresis display apparatus determines that display content differences exist between the two corresponding first areas or the two corresponding second areas of the current and the next image frames, the electrophoresis display apparatus drives the area where display content differences exist in the first and the second areas of the current image frame to display a first-color display content to further update the display contents. Therefore, when the electrophoresis display apparatus determines that there are just some differences between the display content of the current image frame and the display content of the next image frame, the electrophoresis display apparatus performs a ghost image elimination operation only on the area where display content differences exist in the first and the second areas. Thus, the power saving on the electrophoresis display apparatus is achieved.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A driving method of a display panel, suitable for an electrophoresis display apparatus, the driving method comprising:

driving the display panel to display a first image frame and providing display data of a second image frame, wherein each of the first and the second image frames has a first fixed area and a second fixed area for respectively displaying two different display contents, the first fixed area and the second fixed area are mutually exclusive from each other, the first fixed area is configured for displaying graphical contents and the second fixed area is configured for displaying numeral contents, the size of the first fixed area is greater than the size of the second fixed area, the positions of the two corresponding first fixed areas of the first and the second image frames overlap, and the positions of the two corresponding second fixed areas of the first and the second image frames overlap;

determining whether display content differences exist between the two corresponding first fixed areas of the first and the second image frames, and determining whether display content differences exist between the two corresponding second fixed areas of the first and the second image frames;

driving either the first fixed area or the second fixed area of the first image frame having display content difference to display a first-color display content thereby further updating the display contents when display content differences exist between the two corresponding first fixed areas or exist between the two corresponding second fixed areas; and driving the display panel from displaying the first image frame to displaying an all-first-color display content to further update the display contents when display content differences exist between the two corresponding first areas and between the two corresponding second fixed areas.

2. The driving method according to claim 1, wherein after displaying the all-first-color display content and before updating the display contents of the display panel, the display panel is further driven from displaying the all-first-color display content to displaying an all-second-color display content.

3. The driving method according to claim 2, wherein the all-first-color display content is white and the all-second-color display content is black or the all-first-color display content is black and the all-second-color display content is white.

4. An electrophoresis display apparatus comprising:
a display panel;
a gate driver coupled to the display panel;
a source driver coupled to the display panel; and
a timing controller, coupled to the gate driver and the source driver, for driving the display panel to display a first image frame by the gate driver and the source driver and receiving display data of a second image frame, wherein each of the first and the second image frames has a first fixed area and a second fixed area for respectively displaying two different display contents, the first fixed area and the second fixed area are mutually exclusive from each other, the first fixed area is configured for displaying graphical contents and the second fixed area is configured for displaying numeral contents, the size of the first fixed area is greater than the size of the second fixed area, the positions of the two corresponding first fixed areas of the first and the second image frames overlap, the positions of the two corresponding second fixed areas of the first and the second image frames overlap, the timing controller determines whether display content differences exist between the two corresponding first fixed areas of the first and the second image frames, and the timing controller determines whether display content differences exist between the two corresponding second fixed areas of the first and the second image frames, and the timing controller drives the display panel by the gate driver and the source driver, so as to drive either the first fixed area or the second fixed area of the first image frame having display content difference to display a first-color display content thereby further updating the display contents when display content differences exist between the two corresponding first fixed areas or exist between the two corresponding second fixed areas,
wherein when the timing controller determines that display content differences exist between the two corresponding first fixed areas and between the two corresponding second fixed areas, the timing controller further drives the display panel by the gate driver and the source driver, so as to enable the display panel from displaying the first image frame to displaying an all-first-color display content to further update the display contents.

5. The electrophoresis display apparatus according to claim 4, wherein after displaying the all-first-color display content and before further updating the display contents of the display panel, the timing controller further drives the display panel by the gate driver and the source driver, so as to enable the display panel from displaying the all-first-color display content to displaying an all-second-color display content.

6. The electrophoresis display apparatus according to claim 5, wherein the all-first-color display content is white and the all-second-color display content is black or the all-first-color display content is black and the all-second-color display content is white.

7. A driving method of an electrophoresis display panel comprising a first fixed area and a second fixed area mutually exclusive from the first fixed area, the method comprising:
displaying a first display content in said first fixed area at a first timepoint;
displaying a second display content in said second fixed area at said first timepoint;
displaying a third display content in said first fixed area at a second timepoint after said first timepoint;
displaying a fourth display content in said second fixed area at said second timepoint,
wherein when said first display content does not equal said third display content and said second display content equals said fourth display content, the driving method further comprise:
firstly displaying only a first color in said first fixed area and secondly displaying only a second color in said first fixed area in between said first timepoint and said second timepoint; and
displaying only said second display content in said second fixed area in between said first timepoint and said second timepoint;
wherein when said first display content equals said third display content and said second display content does not equal said fourth display content, the driving method further comprise:
firstly displaying only a first color in said second fixed area and secondly displaying only a second color in said second fixed area in between said first timepoint and said second timepoint; and
displaying only said first display content in said first fixed area in between said first timepoint and said second timepoint.

* * * * *